July 4, 1933.  A. WINE  1,916,903
SAFETY BAND SAW
Filed April 18, 1932
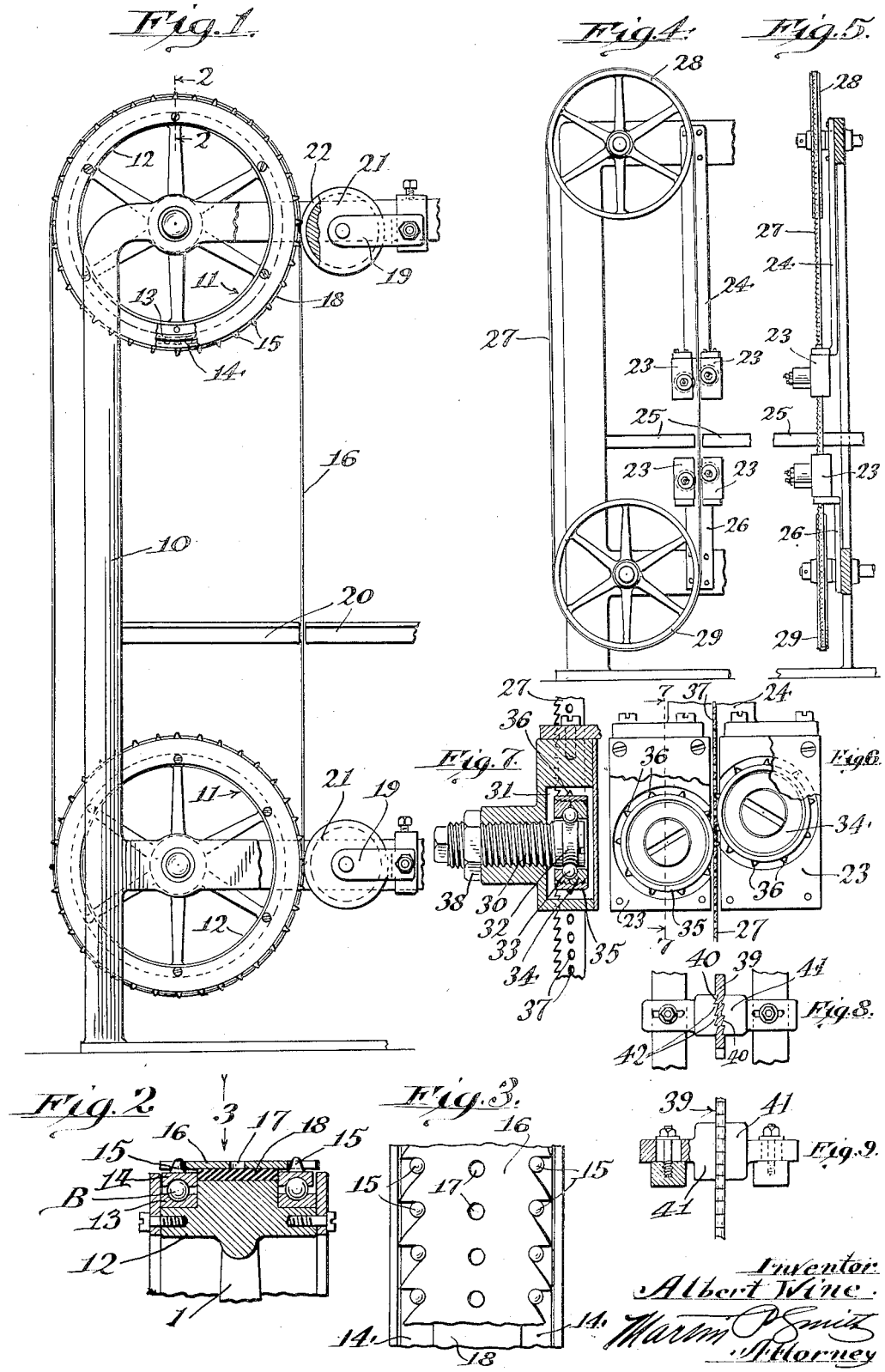

Patented July 4, 1933

1,916,903

UNITED STATES PATENT OFFICE

ALBERT WINE, OF LOS ANGELES, CALIFORNIA

SAFETY BAND SAW

Application filed April 18, 1932. Serial No. 605,861.

My invention relates to a safety band saw and has for its principal object, the provision of relatively simple, practical and efficient means for maintaining under all conditions, the endless flexible blade of the band saw in proper operative position upon the wheels that support and drive said saw and preventing the saw blade from leaving the wheels as a result of pressure applied to the work while the same is in engagement with the flexible blade and while being moved backwardly or forwardly upon the work supporting table.

It will be understood that the endless flexible blades of band saws now in general use frequently leave the wheels that serve as a rolling support for the flexible blade and such action generally results in breakage of the flexible blade and there is also danger of injury to workmen and it is one of the objects of my invention, to provide simple and efficient means that will engage the flexible saw blade and at all times retain the same in proper operative position upon the wheels and which retaining means cooperates with the flexible blade and in no wise interferes with the sawing operations.

A further object of my invention is, to construct the flexible saw blade so that it will cooperate with the means that is utilized for retaining said blade on the wheels or rolling supports of the band saw.

With the foregoing and other objects in view, my invention consists in certain novel features of construction and arrangement of parts that will be hereinafter more fully described and claimed and illustrated in the accompanying drawing in which:

Fig. 1 is a side elevational view of a band saw, constructed in accordance with my invention and with parts broken away and in section.

Fig. 2 is an enlarged cross section taken one the line 2—2 of Fig. 1.

Fig. 3 is an elevational view showing a flexible blade in position upon one of the blade supporting wheels.

Fig. 4 is an elevational view showing a modified form of the means utilized for retaining the flexible blade upon the wheels or rolling supports.

Fig. 5 is a front elevational view of the form of saw illustrated in Fig. 4.

Fig. 6 is an enlarged detail elevational view showing the means utilized for engaging and holding a flexible saw blade in position upon its supporting and driving wheels.

Fig. 7 is a vertical cross section taken on the line 7—7 of Fig. 6.

Fig. 8 is a detail view showing a further modified form for holding a band saw blade in operative position.

Fig. 9 is a front elevational view of that form of blade holding means that is illustrated in Fig. 8.

In Figs. 1, 2 and 3, I have shown my invention applied to a band saw of relatively large size and which is utilized for sawing lumber and the like and in such construction a suitable frame 10 is provided in its upper and lower portions with bearings for wheels 11 that carry the flexible saw blade.

Detachably secured on the rim portion 12 of each wheel adjacent to the edges thereof, are antifriction assemblies comprising inner races 13, outer races 14 and with balls 15 interposed between said races. The races 13 and 14 are in the form of rings that extend entirely around the rim of the wheel and projecting from the outer faces of the outer rings 14, are teeth or studs 15.

When the endless flexible blade 16 is applied to the wheels 11, the teeth or studs 15 engage in the notches between the teeth that are formed on the edges of the blade, as illustrated in Fig. 3.

In some instances it may be found desirable to provide a row of apertures 17 in the flexible blade 16 and where such construction is employed there will be only one antifriction assembly arranged on the wheel rim and such assembly will be located at an intermediate point between the side edges of the wheel.

Applied to the outer face of the rim 12 of the wheel, between the anti-friction assemblies, is a layer 18 of rubber, fiber or analagous material and the outer face of this layer of material is slightly higher than the outer faces of the outer races 14 so that the frictional contact between the layers 18 on the two wheels and the inner face of the flexible saw blade will drive the latter as the wheels are rotated.

The outer race members 14 are free to move independently of the inner race members so as to conform to any stretching or contraction of the flexible blade as a result of temperature changes.

Mounted for rotary movement upon adjustable brackets 19 above and below the work table 20 of the band saw and in horizontal alignment with the axes of the wheels 11 are rollers 21 and the peripheries of these rollers bear directly against the outer face of the flexible blade 16 as it passes downwardly from the upper one of the wheels 11 and on to the lower one of said wheels. The peripheral faces of these rollers 21 are provided with grooves 22 for the accommodation of the ends of the teeth or studs 15 that project beyond the face of the flexible blade.

As a result of this construction, the flexible blade and particularly the down running portion thereof, is effectively retained in proper position upon the wheels 11 and pulling or pushing strains imparted to the blade by the work positioned on table 20, will not cause the blade to run off the wheels, in which event there is possibility of breakage of the blade as well as injury to the workman.

In Figs. 4, 5, 6 and 7, I have illustrated my invention associated with a relatively small form of band saw and which is of the type generally used by cabinet makers and for the sawing of bones in meat cutting operations and in this construction, a pair of small housings 23 are mounted on a suitable bracket 24 a short distance above the work table 25 of the saw and similar housings are mounted on a bracket 26 just below the work table.

All of these housings are practically identical in construction and the members of each pair of housings are located on opposite sides of the downrunning portion of the flexible blade 27 as it passes from the upper wheel 28 of the band saw to lower wheel 29.

Screw-seated in the rear wall of each housing 23, is a short threaded shank 30 and that portion of the shank that terminates within the chamber 31 that is formed in each housing, is a circumferential groove 32 that functions as an inner race for ball bearings 33.

The outer race 34 that is supported by the balls 33 is formed in two parts and these parts are held in assembled relation by a circumferential rim 35 and projecting from the periphery of said rim, is a series of teeth or studs 36. These teeth or studs are adapted to engage in apertures 37 that are formed in the flexible blade 27 and the antifriction assembly in one housing of each pair occupies a horizontal plane slightly above the plane occupied by the other assembly in order that the teeth 36 on the two rims will simultaneously engage in a plurality of the apertures 37 on the flexible blade 27 at the same time, as illustrated in Fig. 6.

Thus the flexible blade is engaged on opposite sides, immediately above and below the work table, by rolling supports and the toothed engagement between said rolling supports and the perforated flexible blade, will maintain the latter in proper operative position and prevent said blade from being forced off the wheels 28 and 29 by pushing or pulling strains that are impressed on the flexible blade by the work.

After shank 30 is screw-seated in its housing 23, in order that the blade engaging rim and anti-friction assembly may be adjusted backwardly or forwardly within its housing so as to conform to the path of travel of the flexible blade and after adjustment, the threaded shank and parts carried thereby may be secured in their adjusted positions by a locknut 38 that is located on said threaded shank.

In Figs. 8 and 9 I have illustrated a construction that is especially designed for use in connection with band saws employing extremely small blades and where it is not feasible to form a row of perforations in the flexible blades.

In this construction the side faces of the blade 39 are provided with longitudinally disposed parallel grooves 40, each groove being provided at one end with an abrupt shoulder that is disposed at right angles to the face of the blade and the shoulders on one face of the blade are arranged at the opposite ends of the grooves from the shoulders on the opposite face of the blade.

Arranged on opposite sides of this form of blade and adjustably mounted on suitable supports above and below the work table, are short vertically disposed blocks 41, and formed on the faces of said blocks that engage the flexible blade are vertically disposed ribs or teeth 42 that correspond in shape with the grooves in the side faces of said blade.

During the operation of the blade, the latter passes between the blocks 41 and the engagement of the teeth 42 in the grooves 40 in said blade and particularly the engagement of the reversely arranged shoulders of said grooves and teeth effectually prevents the blade from being pushed or pulled backwardly or forwardly from proper position between the blocks and consequently the blade maintains its proper position on the supporting and driving wheels of the saw.

In some instances it may be found desirable to utilize rollers in the place of the blocks 41 and where rollers are used the peripheries thereof will be provided with ribs that correspond in shape to the grooves in the side faces of the flexible blade.

Thus it will be seen that I have provided a safety band saw that is relatively simple in construction, inexpensive of manufacture and very effective in performing the functions for which it is intended.

Where my improved construction is employed, it is not necessary to provide any back rest for the saw blade and the blade is at all times maintained in proper operative position upon the supporting and driving wheels of the saw and particularly while said blade is subjected to pulling and pushing strains from the work as it is manipulated on the work table and which strains would otherwise cause the flexible blade to run off the supporting and driving wheels.

In the construction disclosed in Figs. 1 to 3 inclusive, the frictional engagement between member 18 and the flexible blade drives the latter and the outer race members 14 carrying the studs 15 that engage the teeth of the blade effectually prevents movement of the blade in either direction sidewise upon the wheel and as the race members 14 are free to move independently circumferentially of the wheel, they will automatically position themselves in the event that there is any creepage of the blade on the wheel during operation.

The form of saw blade illustrated in Figs. 2 and 3 and which blade is provided with teeth on both edges is particularly applicable for the larger forms of saws that are used in sawing logs and large timbers and which latter during sawing operations are carried upon a reciprocating carriage.

Suitable means may be provided for shifting the carriage or the work laterally a short distance at the end of each of its longitudinal strokes and thus the saw will cut lengthwise through the log or timber during each reciprocation of the carriage, with the result that approximately twice the amount of work may be accomplished as compared to saw mills wherein the work is engaged by the saw only during the forward movement of the carriage.

By forming perforations in the flexible blades for the accommodation of the teeth or studs on the blade retaining devices, air may freely circulate through said perforations, particularly while the blade is in motion and such provision tends to counteract overheating of the blade while in service.

It will be understood that minor changes in the size, form and construction of the various parts of my improved safety band saw may be made and substituted for those herein shown and described without departing from the spirit of the invention, the scope of which is set forth in the appended claims.

I claim as my invention:

1. The combination with an endless flexible saw blade, of a wheel for supporting said blade and teeth mounted for circumferential movement upon and projecting from the periphery of said wheel for engagement between the teeth of said endless flexible blade.

2. The combination with an endless flexible saw blade, of a wheel for supporting said blade, a member mounted for independent circumferential movement of the periphery of said wheel and teeth projecting from said member for engagement with the teeth of said endless flexible blade.

3. In a safety band saw, a frame, a pair of wheels mounted for operation on said frame and endless flexible blades carried by said wheels, the peripheral portions of said wheels and said blade having interengaging parts for maintaining the blade in proper operative position on said wheels and the interengaging parts carried by the wheels being mounted for independent circumferential movement thereupon.

4. In a safety band saw, a frame, a pair of wheels mounted for operation on said frame, an endless flexible blade mounted for operation on said wheels, means mounted for circumferential movement upon the peripheries of said wheels for engaging between the teeth of said flexible blade, blade engaging members arranged above and below the work support of the saw on opposite sides of said blade and said blade engaging members and blade having interengaging parts to maintain said blade in proper position upon said wheels.

5. In a safety band saw, the combination with an endless flexible blade, of an anti-friction member engaging the side face of said blade and teeth carried by said anti-friction member for engagement between the teeth of the saw blade.

6. In a safety band saw, an endless flexible blade supporting wheel, an endless member mounted for independent circumferential movement on the periphery of said wheel and saw teeth engaging members projecting from the periphery of said endless member.

7. In a safety band saw, an endless flexible blade supporting wheel, an endless member mounted for independent circumferential movement on the periphery of said wheel, saw teeth engaging members projecting from the periphery of said endless member and a layer of friction producing material on the periphery of said wheel adjacent to said circumferentially movable member.

8. In a safety band saw, an endless flexible blade supporting wheel, a pair of endless members mounted for independent circumferential movement on the periphery of said wheel adjacent to the edges thereof and saw teeth engaging members carried by said circumferentially movable members.

9. In a safety band saw, an endless flexible blade supporting wheel, a pair of endless members mounted for independent circumferential movement on the periphery of said wheel adjacent to the edges thereof, saw teeth engaging members carried by said circumferentially movable members and a layer of friction producing material on the periphery of said wheel between said circumferentially movable members.

In testimony whereof I affix my signature.

ALBERT WINE.